US012365069B2

(12) United States Patent
Lim et al.

(10) Patent No.: US 12,365,069 B2
(45) **Date of Patent: *Jul. 22, 2025**

(54) POWER TOOL

(71) Applicant: BLACK & DECKER, INC., New Britain, CT (US)

(72) Inventors: Jongsoo Lim, Timonium, MD (US); Jonathan Kirkpatrick, Baldwin, MD (US); Merrill Myers, Towson, MD (US); Stuart E. Garber, Dunedin, FL (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,979

(22) Filed: Jul. 25, 2023

(65) Prior Publication Data

US 2023/0364760 A1 Nov. 16, 2023

Related U.S. Application Data

(63) Continuation of application No. 17/245,971, filed on Apr. 30, 2021, now Pat. No. 11,745,323.

(60) Provisional application No. 63/118,177, filed on Nov. 25, 2020.

(51) Int. Cl.

| | |
|---|---|
| ***B25C 1/06*** | (2006.01) |
| ***B25C 1/00*** | (2006.01) |
| ***B25C 5/15*** | (2006.01) |
| ***B25C 5/16*** | (2006.01) |

(52) U.S. Cl.
CPC ................ *B25C 1/003* (2013.01); *B25C 1/06* (2013.01); *B25C 5/15* (2013.01); *B25C 5/1617* (2013.01); *B25C 1/008* (2013.01)

(58) Field of Classification Search
CPC ..... B25C 1/06; B25C 1/001–005; B25C 5/15; B25C 5/1617; B25C 5/162
See application file for complete search history.

(56) References Cited

U.S. PATENT DOCUMENTS

| | | | | |
|---|---|---|---|---|
| 1,604,220 A | 10/1926 | Grover | | |
| 2,572,012 A | 10/1951 | Curtis | | |
| 7,494,036 B2 * | 2/2009 | Shima | B25C 1/06 | 227/8 |
| 7,866,521 B2 | 1/2011 | Gross et al. | | |
| 7,934,566 B2 * | 5/2011 | Hlinka | B25C 1/06 | 173/90 |
| 8,162,073 B2 | 4/2012 | Krondorfer | | |

(Continued)

*Primary Examiner* — Joshua G Kotis
(74) *Attorney, Agent, or Firm* — Amir R. Rohani

(57) ABSTRACT

A tool is provided for applying fasteners to a workpiece. The tool has a housing with a nosepiece, a motor, a drive actuator, a magazine assembly that holds fasteners, and a feed assembly with a feed actuator configured to move a lead fastener into the nosepiece. A driver in the housing is driven by a drive system that is associated with the driver actuator. A controller is connected to the feed actuator and the drive actuator to implement a firing sequence for driving each lead fastener into the workpiece using the driver and feeding the lead fastener into the nosepiece assembly. The actuators may be in the form of solenoids. The controller is designed to energize and deenergize the motor selectively while the drive actuator and feed actuator are activated.

20 Claims, 16 Drawing Sheets

(56) References Cited

U.S. PATENT DOCUMENTS

| | | | | |
|---|---|---|---|---|
| 8,313,012 | B2 * | 11/2012 | Shima | B25C 1/06 227/129 |
| 8,636,185 | B2 | 1/2014 | Largo | |
| 9,744,657 | B2 | 8/2017 | Baron et al. | |
| 10,322,501 | B2 * | 6/2019 | Garber | B25C 1/008 |
| 10,693,344 | B2 | 6/2020 | Purohit et al. | |
| D911,803 | S | 3/2021 | Kirkpatrick et al. | |
| 10,933,521 | B2 | 3/2021 | Ferris | |
| 11,224,960 | B2 | 1/2022 | Garces | |
| 11,370,095 | B2 | 6/2022 | Chien | |
| 11,498,195 | B2 | 11/2022 | Akiba | |
| 11,745,323 | B2 * | 9/2023 | Lim | B25C 1/06 227/120 |
| 2010/0065294 | A1 * | 3/2010 | Hirabayashi | B25C 1/06 173/122 |
| 2013/0320066 | A1 | 12/2013 | Gregory et al. | |
| 2014/0076951 | A1 | 3/2014 | Brendel | |
| 2014/0097223 | A1 * | 4/2014 | Baron | B25C 1/06 227/129 |
| 2015/0306753 | A1 * | 10/2015 | Po | B25C 1/06 227/109 |
| 2016/0207185 | A1 * | 7/2016 | Garber | B25C 1/008 |
| 2018/0243889 | A1 | 8/2018 | Myers et al. | |
| 2020/0039044 | A1 | 2/2020 | Akiba | |
| 2020/0189080 | A1 | 6/2020 | Aizawa | |
| 2020/0306941 | A1 | 10/2020 | Akiba | |
| 2022/0040836 | A1 | 2/2022 | Chien | |
| 2022/0347826 | A1 | 11/2022 | Schroeder | |

* cited by examiner

POWER TOOL

RELATED APPLICATION(S)

This application is a continuation of U.S. patent application Ser. No. 17/245,971, filed Apr. 30, 2021, which claims the benefit of U.S. Provisional Patent Application No. 63/118,177, filed Nov. 25, 2020, and is related to U.S. Design patent application Ser. No. 29/694,590, filed Jun. 12, 2019, now U.S. Pat. D911,803, the entire contents of each of which are hereby incorporated by reference herein in their entireties.

FIELD

This disclosure relates, in general, to the field of power tools. In particular, the disclosure relates to portable fastening or driving tools, such as a nailers and staplers, and more particularly to improvements in such tools by using multiple actuators for driving a fastener into a workpiece.

BRIEF DESCRIPTION OF THE PRIOR ART

Fastening tools, such as power nailers and staplers, are relatively commonplace in the construction trades. Several types of cordless nailers have been introduced to the market in an effort to satisfy the demands of modern consumers. Some of the cordless nailers use a spring-loaded device to push fasteners into position such that a drive mechanism may then be actuated to fire or push a fastener into a workpiece.

Coil nailers, which typically include a drum for storing a coil of collated fasteners and a feed mechanism for feeding the fasteners into nosepiece of the fastening tool, are known in the art for attaching a series or a succession of nails or fasteners into workpieces.

Yet the coordinated driving and feeding of fasteners may be improved.

SUMMARY

It is an aspect of this disclosure to provide a tool including: a housing having a nosepiece assembly; a motor; a drive actuator; and a magazine assembly configured to hold a plurality of fasteners. A feed assembly is associated with the magazine assembly that is configured to advance the fasteners in a feed direction to present a lead fastener into the nosepiece assembly. The feed assembly has feed actuator configured to move said lead fastener into the nosepiece assembly. The tool also includes a driver provided in the housing that is configured for translational movement within a drive channel along a drive axis to drive the lead fastener into a workpiece. A drive system, associated with the drive actuator, is configured to selectively drive the driver along the drive axis. Also, the tool has a controller connected to the feed actuator and the drive actuator to implement a firing sequence for driving each lead fastener into the workpiece using the driver and feeding the lead fastener into the nosepiece assembly. The firing sequence implemented by the controller includes sending a first electric pulse to the drive actuator and a second electric pulse to the feed actuator. The motor is activated for at least a portion of a time between the first electric pulse and the second electric pulse.

Another aspect of this disclosure provides a method for operating the tool. For example, the method may include deactivating power to the motor; activating the drive actuator to thereby cause the translational movement of the driver thus drive the lead fastener into the workpiece; and activating the feed actuator to feed the lead fastener into the nosepiece assembly. In an embodiment, a time delay is provided before activating the feed actuator. In one embodiment, the motor is deactivated for at least a part of each of the first and second electric pulses sent to activate the drive actuator and the feed actuator.

Other aspects, features, and advantages of the present disclosure will become apparent from the following detailed description, the accompanying drawings, and the appended claims.

BRIEF DESCRIPTION OF THE DRAWINGS

The numerous advantages of this disclosure may be better understood by those skilled in the art by reference to the accompanying Figures. In the drawings, like reference numerals designate corresponding parts throughout the several views.

Corresponding reference numerals indicate corresponding parts throughout the several views of the drawings.

DETAILED DESCRIPTION OF THE PREFERRED EMBODIMENT(S)

This disclosure relates, in general, to the field of power tools. For example, this disclosure relates to cordless, portable driving tools, such as a nailers and staplers, and improvements made therein to both driving capabilities and feeding features associated therewith. In particular, the tool includes two actuators-one for driving a fastener, another for feeding the fastener-which are controlled by a power control module, along with a motor, in order to drive and load fasteners in succession and, in some cases, ready the tool such that shot-to-shot time of fasteners is increased.

In accordance with an embodiment, the drive actuator, the driver, and the drive system used in the tool and described below may be an electrical actuator, drive, and drive system as described in U.S. Pat. No. 9,744,657, which is incorporated by reference herein in its entirety. In accordance with an embodiment, the feed actuator, the magazine assembly used in the tool and as described below, and the feed assembly used in the tool may be an electrical actuator, magazine assembly, and feeder assembly as described in U.S. Pat. No. 7,866,521, which is incorporated by reference herein in its entirety. For example, the feed assembly and feed actuator as shown in the Figures may be an automatic coil feeder assembly as shown in FIGS. 25-27 of the incorporated '521 patent.

FIGS. 1-12 illustrates an embodiment of a fastener driving tool 10 (i.e., "tool") that is adapted to drive fasteners into a workpiece. The fasteners may be U-shaped staples, brads, nails, and the like. In an embodiment, the fasteners may be collated. The tool 10 may be a cordless power tool, in accordance with an embodiment. In one exemplary embodiment, the tool 10 is a nailer or nail gun configured to drive nails into a workpiece.

Figure 1:
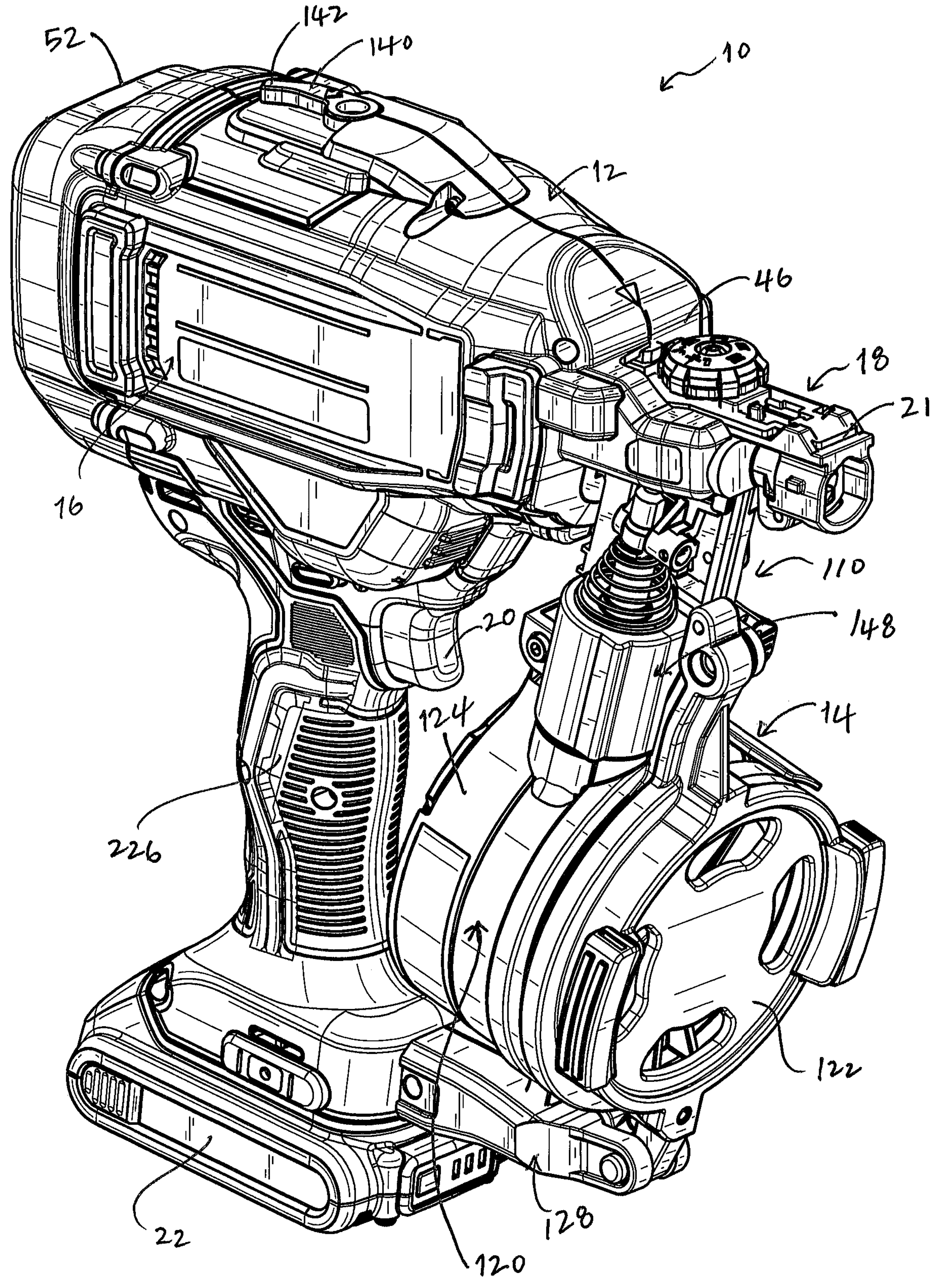
FIG. 1 illustrates a top and right-side perspective view of a cordless power tool in accordance with an embodiment.
Figure 2:
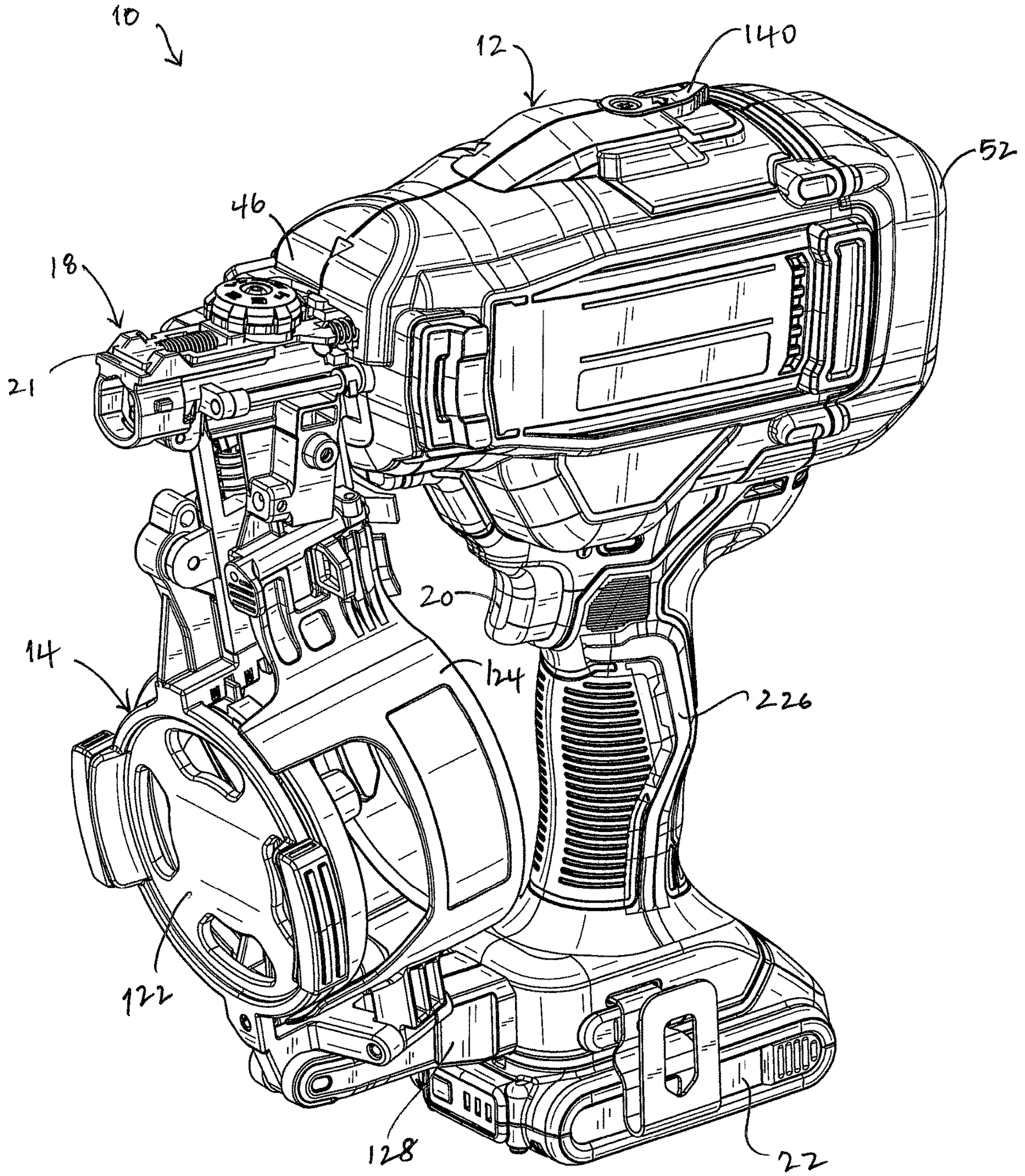
FIG. 2 illustrates a top and left-side perspective view of the tool of FIG. 1.
Figure 3:
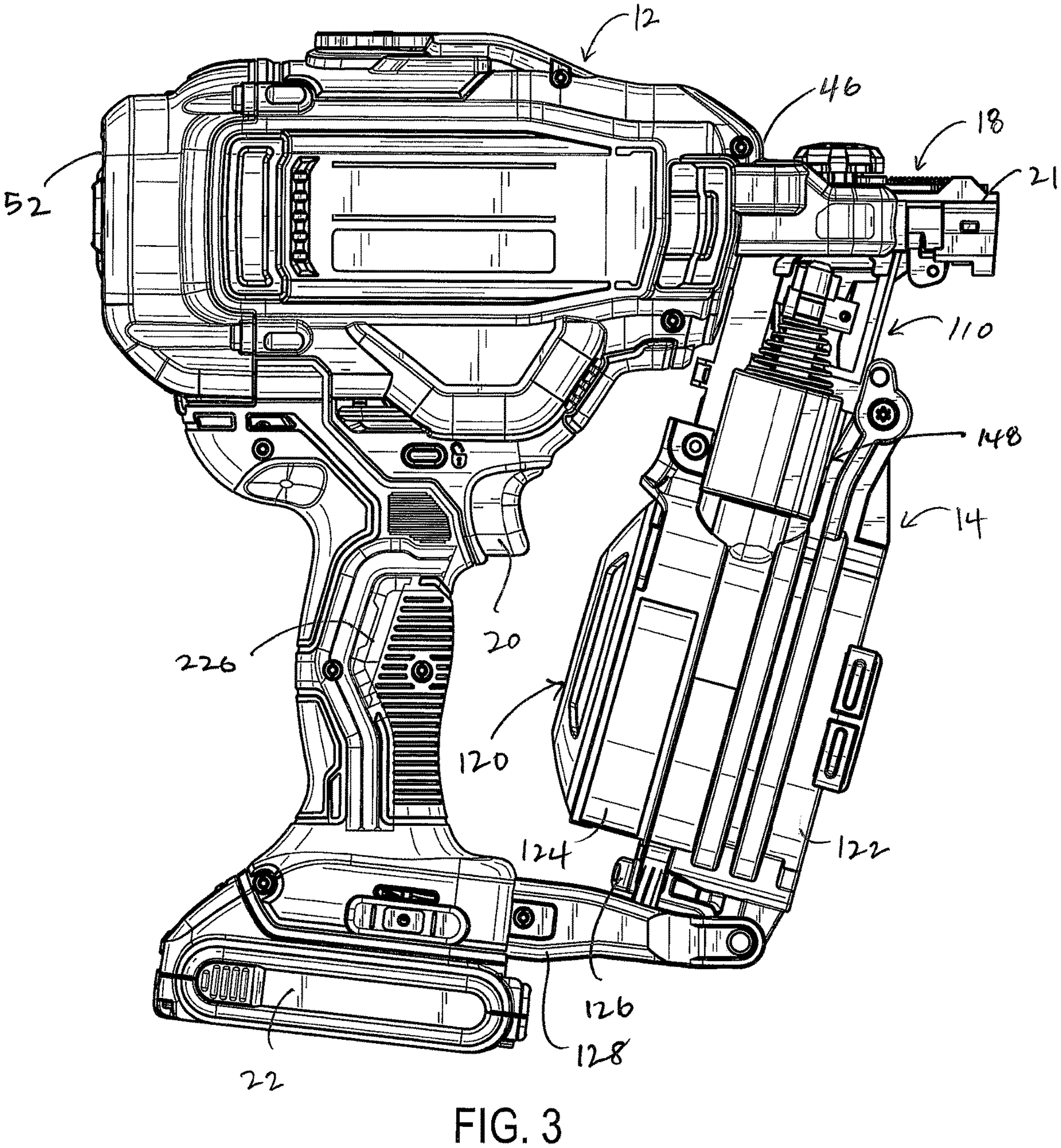
FIG. 3 illustrates a right-side elevation view of the tool of FIG. 1.
Figure 4:
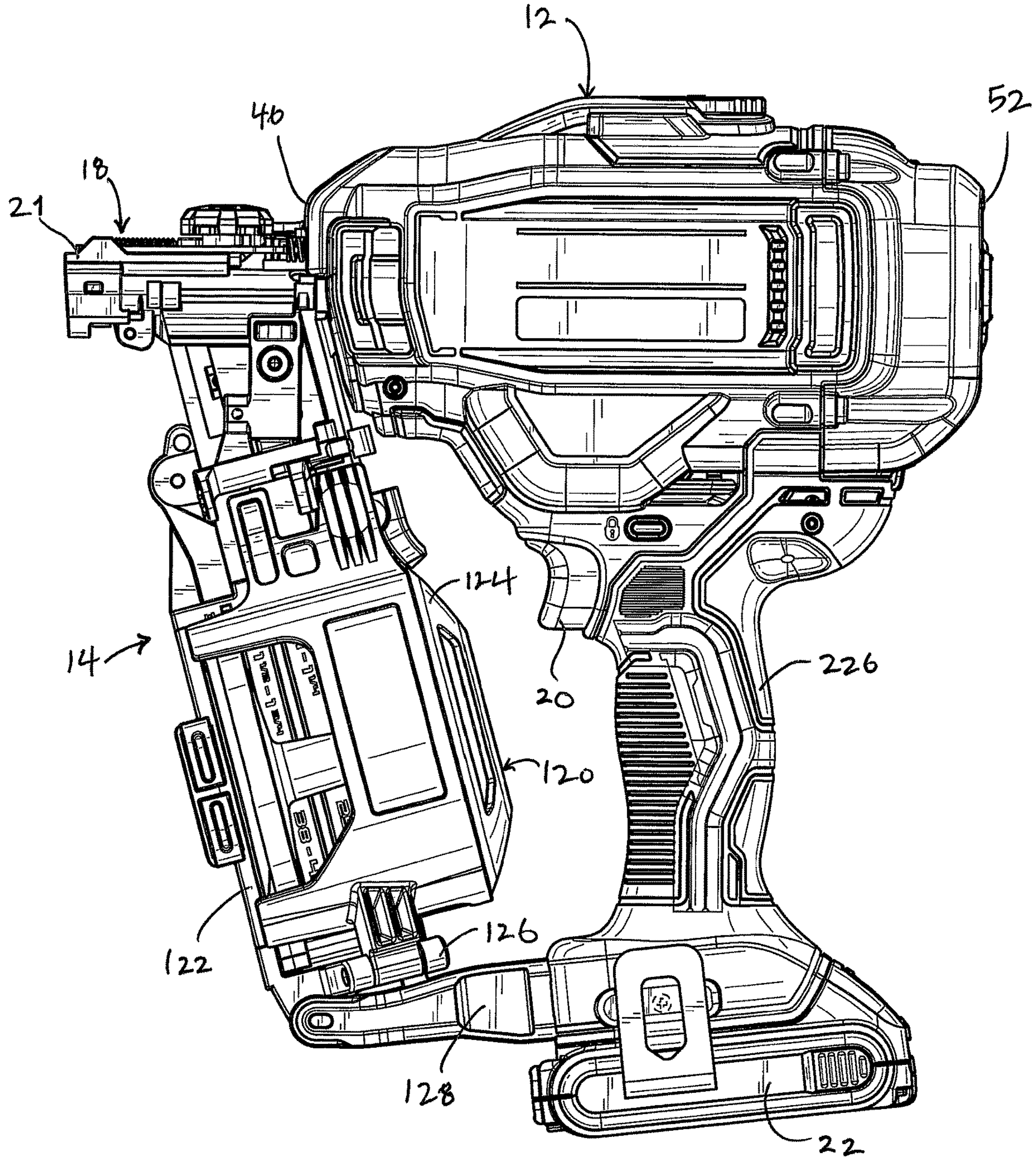
FIG. 4 illustrates a left-side elevation view of the tool of FIG. 1.
Figure 5:
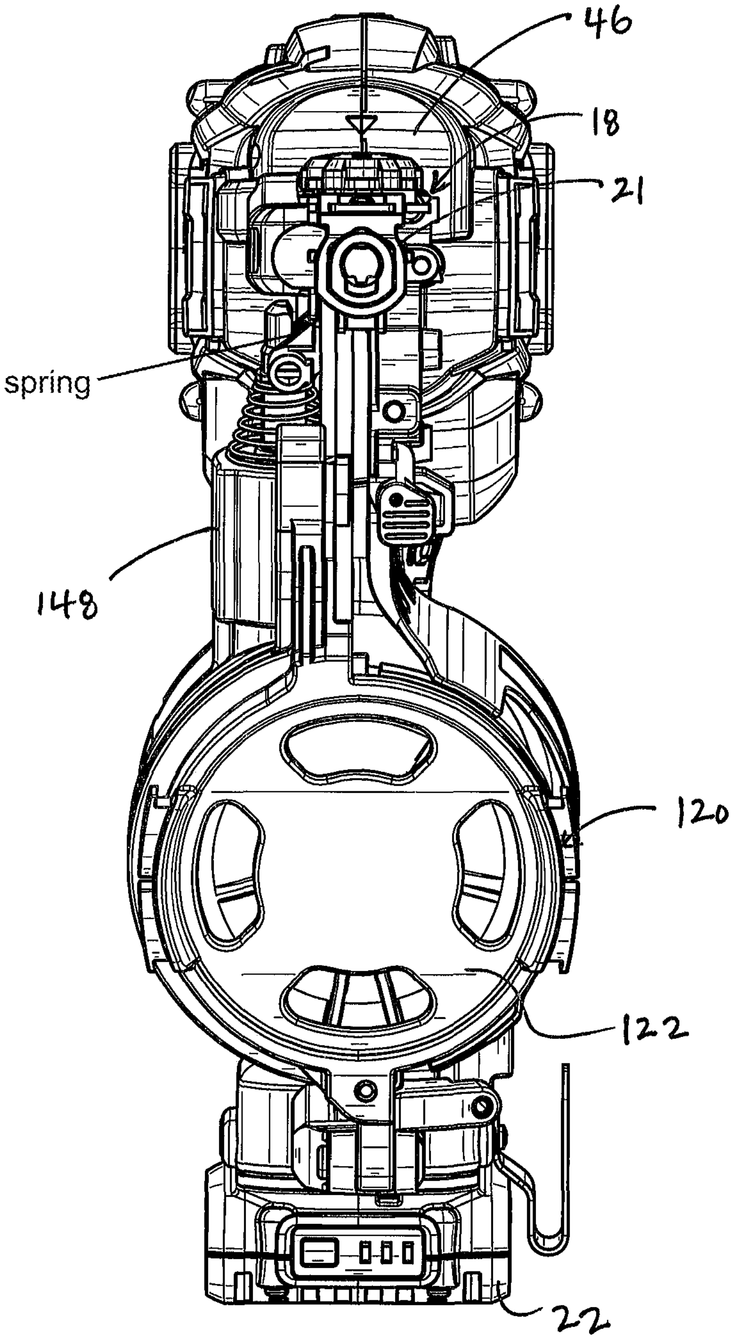
FIG. 5 illustrates a front elevation view of the tool of FIG. 1.
Figure 6:
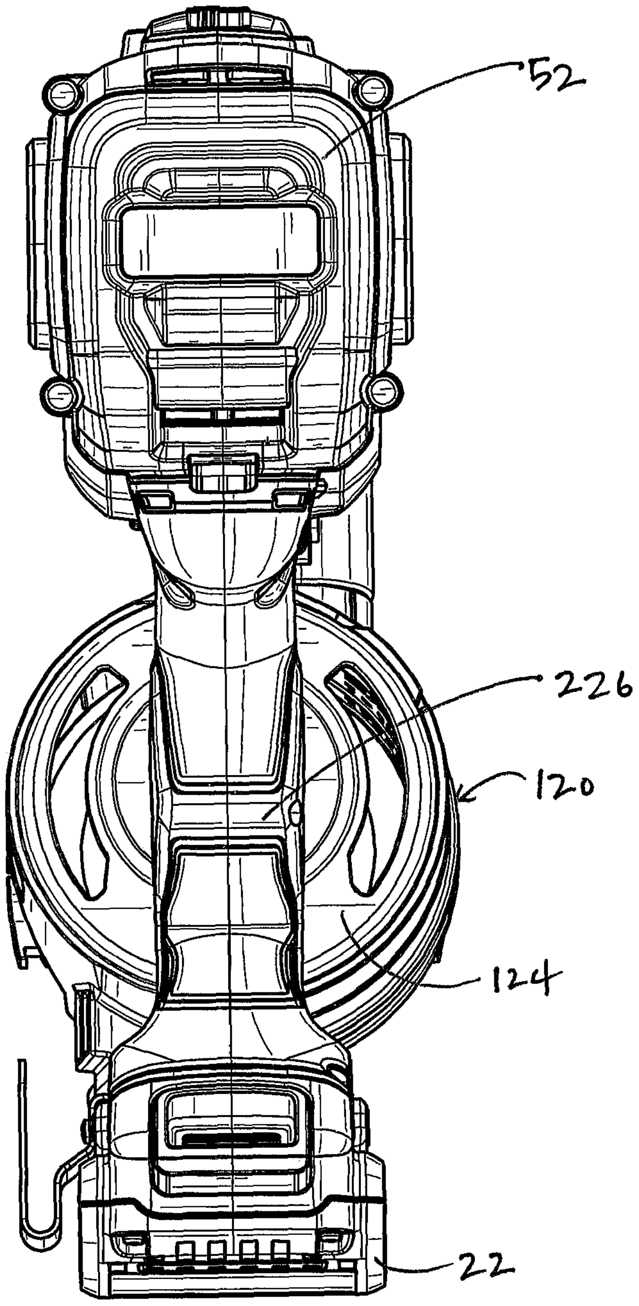
FIG. 6 illustrates a rear elevation view of the tool of FIG. 1.
Figure 10:
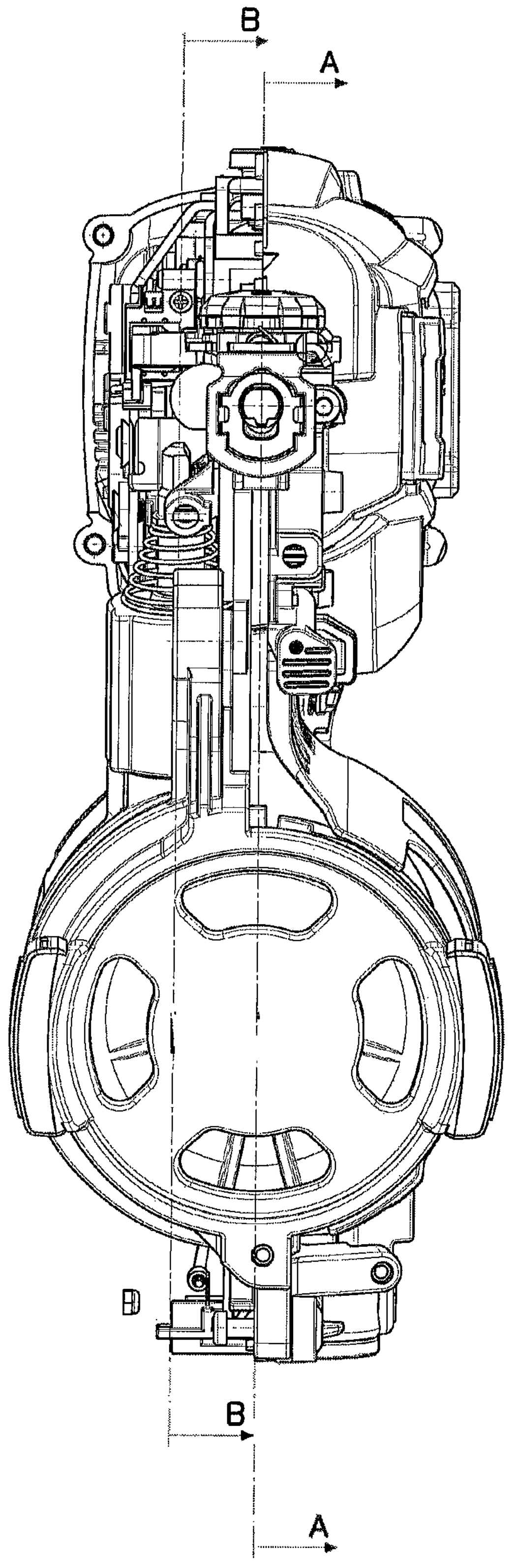
FIG. 10 illustrates a front elevation view of the tool as shown in FIG. 9.

The tool 10 includes a housing assembly (or housing) 12 that has a nosepiece assembly 18; a motor 32 that is part of a drive system 16 (or drive motor assembly) and a power source 24; and a magazine assembly 14 configured to hold a plurality of fasteners coupled to the housing assembly 12. The magazine assembly 14 may be provided such that it extends between the nosepiece assembly 18 and a base portion of the tool (e.g., near a removable battery pack 22), in accordance with an embodiment. The housing assembly 12 has a front end 46 and a back end 52. The housing assembly 12 may include a handle 226 adapted to be gripped by the hand of an operator or user. In an embodiment, the handle 226 extends between a top end and a bottom end of the housing assembly 12. In an embodiment, the housing assembly 12 may be formed from molded parts. As generally represented in FIGS. 1, 5, and 10, for example, in one embodiment, a first side part and a second side part of the housing assembly 12 may be molded and joined together to encapsulate parts of the fastener driving and feed mechanisms (described in greater detail later) within the housing 12. The housing assembly 12 may be made of extruded or molded plastic, for example. In one embodiment, the housing 12 may be formed from an Acrylonitrile Butadiene Styrene (ABS) plastic. Of course, other materials, such as polycarbonates and/or combinations of materials, may also be used to form the housing 12, and thus these examples should not be limiting.

Figure 11:
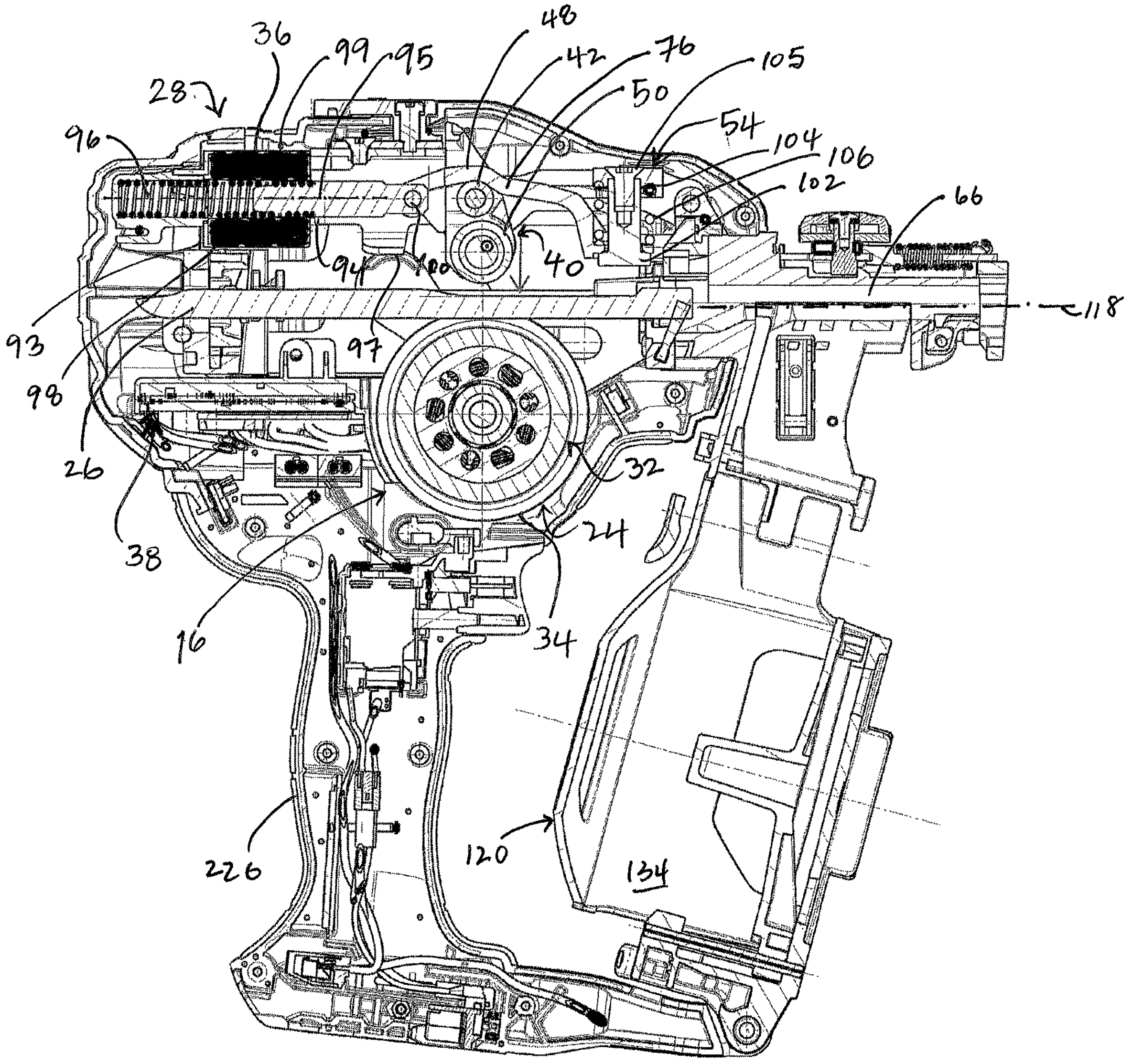
FIG. 11 is a cross-sectional view along line A-A of the tool in FIG. 10 showing features of a drive actuator and drive system, in accordance with an embodiment herein.
Figure 15:
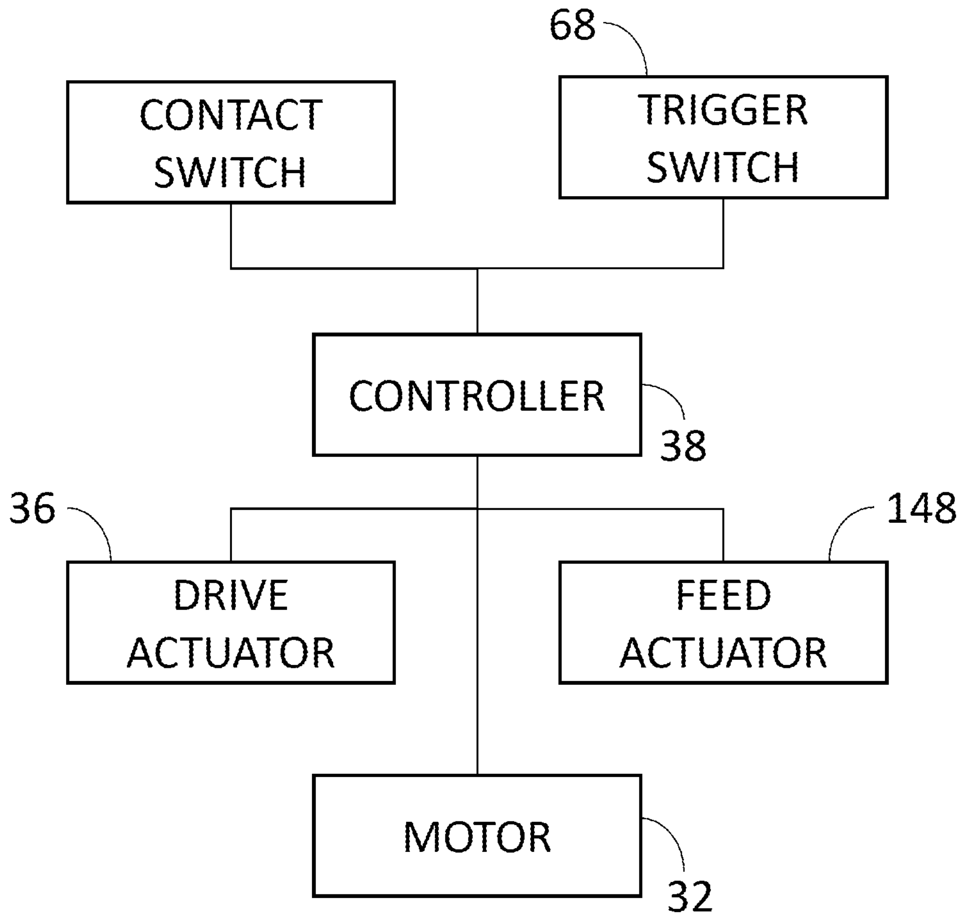
FIG. 15 illustrates a schematic representation showing electrical connections between the controller and drive and feed actuators, as well as some of the switches and motor included in the tool, in accordance with an embodiment.

The housing assembly 12 may include a trigger 20, adjacent to or on the handle 226, which is connected to a power control module 38 (also referred to in this disclosure as a control unit or controller). The trigger 20 may be provided in the form of a button for manual operation such that when an operator grips the handle 226, the trigger 20 may be engaged by a forefinger of the operator. The trigger 20 is mechanically coupled to the handle 226 and electrically coupled to at least the motor 32 and control module 38 (or controller) such that electric power may be selectively provided thereto, such as schematically shown in FIG. 15. The trigger 20 may be a push button that moves back and forth, or a button that may be pivotally mounted to the housing assembly 12 by way of a pivot, such that application of force via the operator's forefinger moves the trigger 20 relative to the handle 226. The trigger 20 may be associated with a trigger switch 68 (see FIG. 9), a contact trip assembly 21, and control module 38 (see FIG. 11). The contact trip assembly 21 acts as a safety mechanism to prevent accidental activation of the tool 10. Generally, an operator of the tool 10 may hold or grip the tool 10 by providing their hand around the handle 226 and place the nosepiece assembly 18 at a desired location for applying a fastener, push down on the contact trip assembly 21, and depress the trigger 20 in order to activate the control module 38 and the internal actuators (as described later) and cause a fastener to be ejected at that desired location. In an optional embodiment, a contact trip assembly 21 may be provided on the nosepiece assembly 18. The contact trip assembly 21 may act as a safety device for the tool 10, such that the safety device must first be deactivated in order to propel the driver 26 and drive a fastener into the workpiece. Other safety devices (e.g., mechanical and/or electrical, like switches) may also be provided in the tool 10. In an embodiment, the contact trip assembly 21 includes a contact trip (or contact trip member) actuatable to initiate the drive stroke. The contact trip may be positioned in front of the driver 26 (such as shown in FIG. 11) in the housing 12 of tool 10. The contact trip is configured for movement relative to the housing assembly 12 parallel to the movement of the driver 26. Also provided are a contact trip spring and a contact trip switch. The contact trip switch is configured such that the switch may be tripped or actuated (e.g., closed) to allow use of the tool 10 (when all conditions are met for driving or firing), and may also be electrically coupled to the controller (such as shown in FIG. 15). The contact trip switch may be provided in a normally open position and closed when the contact trip spring is compressed by force upon the contact trip itself, for example. In an exemplary embodiment, as an operator applies force or bias on the tool 10, i.e., towards a workpiece, a contact surface of the contact trip assembly 21 engages the workpiece and then actuates movement of the body of the contact trip relative to the drive channel, thereby closing a trip switch and spring-loading or compressing the contact trip spring which normally biases the contact trip assembly 21 relatively forward (e.g., to the right as shown in FIG. 11) such that the tool is disabled from firing. When the trigger 20 is actuated by the operator's forefinger (e.g., the trigger switch 68 is closed) and all other conditions for firing are met, the drive system 16 and thus the motor 32 may be initiated i.e., activated or energized, to fire a fastener. Such features are known in the art and thus not further described here.

In addition to the contact trip assembly 21, the nosepiece assembly 18 may include a barrel 66 (see FIG. 11) which forms a part of the drive channel for the driver 26 to move within an interior portion thereof and drive a fastener. In accordance with an embodiment, the nosepiece assembly 18 used in the tool may include one, some, or all features as described in U.S. Publication No. 20130320066 and/or U.S. Publication No. 20180243889, both of which are incorporated by reference herein in their entireties.

The magazine assembly 14 is an elongated receptacle that extends away from the nosepiece assembly 18, towards a back end of the handle 226. In an embodiment, the magazine assembly 14 may be positioned an acute angle relative to the handle 226 and extending between the nosepiece assembly 18 and a bottom portion of the handle 226, such that a bottom portion (i.e., a bottom of the canister 120) of the magazine assembly 14 may be positioned at an acute angle relative to a workpiece W when the nosepiece assembly 18 is positioned and configured for applying the fastener thereto.

The magazine assembly 14 holds a plurality of fasteners or nails that are configured to be dispensed from the tool 10 with sufficient energy to penetrate a workpiece. As shown, the example fastener driving tool 10 is a battery-powered nailer with a battery pack 22 and the magazine assembly 14 is configured to hold collated nails. The magazine assembly 14 (via its parts therein) is generally configured to sequentially present a lead fastener of the plurality of fasteners into a drive channel of the tool 10. As can be appreciated, the principles, technologies and structures described herein can also be used on other fastening devices including electric or pneumatic staplers, nailers, and the like. Further, the term "fastener" herein is intended to include staples, nails, and the like. In some instances throughout this disclosure, fastener and nail may be used interchangeably.

In accordance with a non-limiting embodiment, the magazine assembly 14 may include a canister 200 for holding coiled, collated nails and a feed mechanism or feed assembly 110, which may include a feed pawl assembly (not shown) and a follower pawl assembly (not shown). In an embodiment, one or more teeth or guides may be provided as part of the feed assembly 110. The canister 200 may include a first canister portion 212, a second canister portion 214, a hinge pin 216, as well as a latch bracket and a canister latch. The first canister portion 212 may be fixedly coupled to the housing assembly 12. In an embodiment, the first canister portion 212 includes a first mount 128 (see, e.g., FIG. 3, which may be fixedly but removably coupled to a handle 226 of the housing assembly 12 via a threaded fastener, and a second mount 130 (see, e.g., FIG. 12), which may be fit over a portion of the feed assembly 110. A vent hole 132 (shown in FIG. 12) may be formed in the second mount 130 to permit air to enter or exit an open end in the feed assembly 110.

The second canister portion 214, which may be formed of an appropriate plastic material, may be pivotally coupled to the first canister portion 212 so that the second canister portion 214 may be moved between a first position, which may substantially close an interior portion 134 (see FIG. 11) of the canister 200, and a second position, which may generally clear the first canister portion 212 so that coiled, collated nails may be loaded into the interior portion 134 of the canister 200. The aforementioned canister latch may be actuated so that the second canister portion 214 may be rotated about the hinge pin 216 to expose an interior portion of the canister 200 for its loading. A coil of the collated fasteners may be inserted into the canister 200 and an end of the collated fasteners with a lead fastener may be strung towards the drive channel or barrel 66 such that one of the collated fasteners is positioned in the feed assembly 110 for feeding (e.g., using teeth and/or a pawl assembly, and feed actuator 148, as described later).

In one embodiment, the bottom end of the housing may have a removable and rechargeable energy storage device, which may include a battery pack 22. The battery pack 22 may configured to engage an end portion of the tool 10 and provide power to a motor 32 within the housing assembly 12, such that the tool 10 may drive one or more fasteners which are fed from the magazine assembly 14 into a workpiece W. The location of the battery pack 22 as shown in the Figures is not limiting and is illustrative only; indeed, the battery pack can be located anywhere on the tool 10. In addition, although the energy storage device is illustrated as being a battery pack, embodiments of this disclosure are not limited to battery packs being the energy storage device. That is, in some embodiments, the tool 10 may include a cord and a plug for plugging into a common household AC outlet.

While the fastening tool is illustrated as being electrically powered by a suitable power source or energy storage device, such as the battery pack 22, those skilled in the art will appreciate that the disclosure, in its broader aspects, may apply to other powered fastening tools. Furthermore, while aspects of the disclosure are described herein and illustrated in the accompanying drawings in the context of a nailer, those of ordinary skill in the art will appreciate that the invention, in its broadest aspects, has further applicability. For example, the drive motor assembly may also be employed in various other mechanisms that use reciprocating motion, including rotary hammers, hole forming tools, such as punches, and riveting tools, such as those that install deformation rivets.

Figure 9:
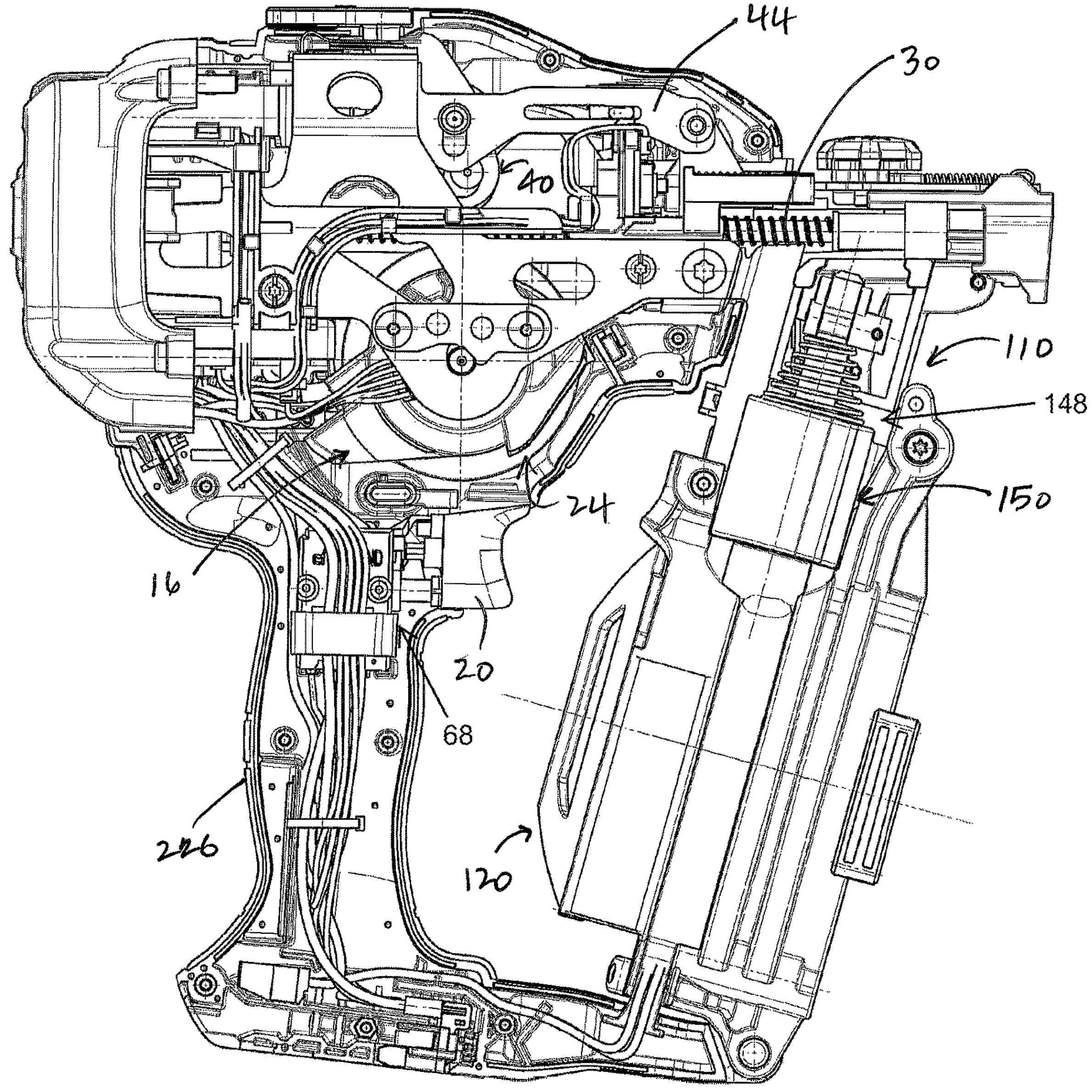
FIG. 9 illustrates a front view of the tool of FIG. 1, with a portion of the housing removed to illustrate internal mechanisms therein.
Figure 12:
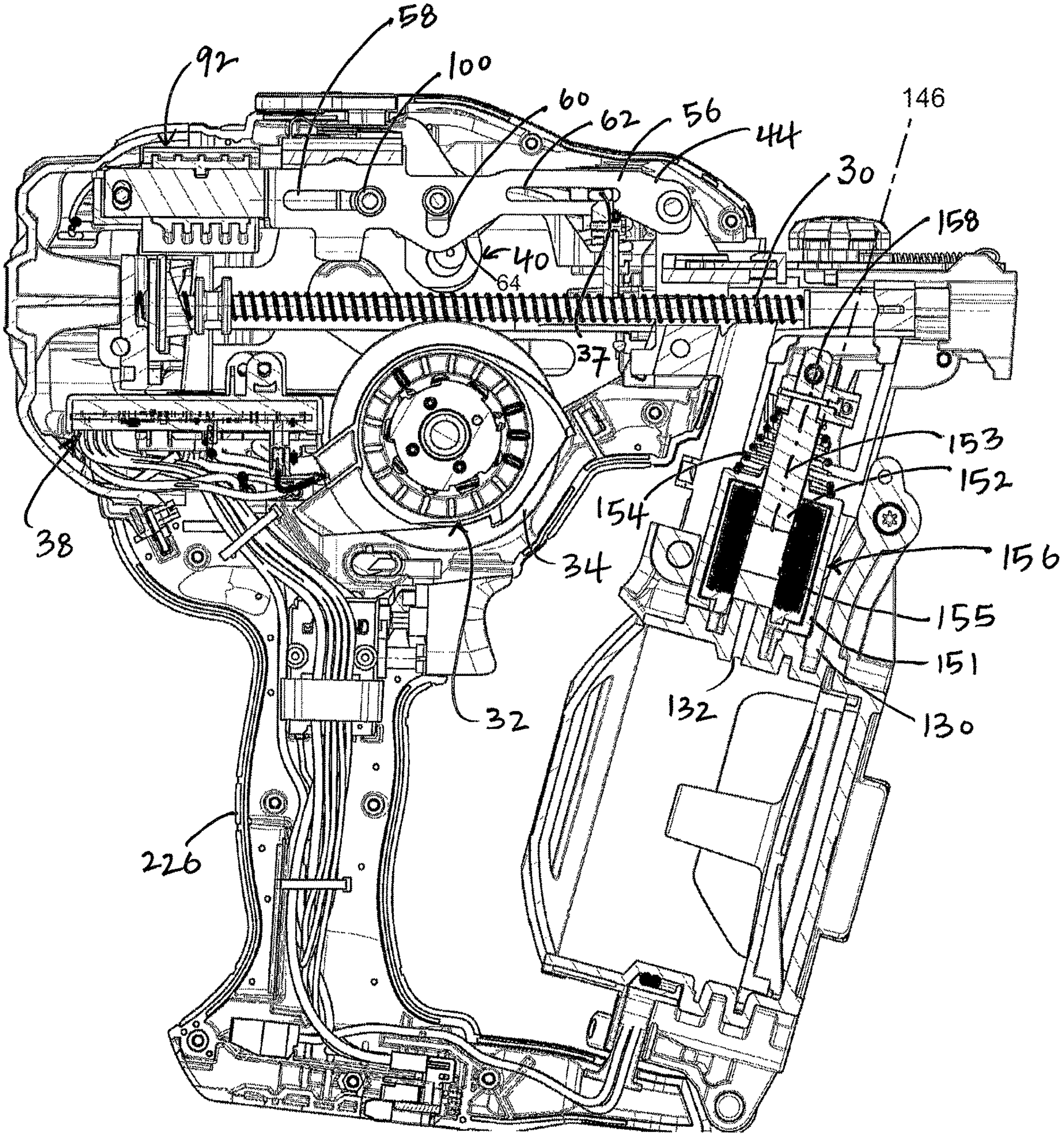
FIG. 12 is a cross-sectional view along line B-B of the tool in FIG. 10 showing features of a feed actuator and a feed system, in accordance with an embodiment herein.

A drive system 16, associated with a drive actuator 36, is configured to selectively drive the driver 26 along a drive axis 118 (or path), to drive a nail or fastener. The drive system 16 (also referred to herein as a drive motor assembly), as shown in FIGS. 9 and 11-12, may include a power source 24, a driver 26 (see FIG. 11), an activation arm assembly 28 (see FIG. 11), and a return mechanism 30 (see FIGS. 9 and 12), in accordance with an embodiment. In the exemplary illustration, the power source 24 includes a motor 32, a flywheel 34, and a drive actuator 36, as shown in FIG. 11. That is, in accordance with an embodiment, the motor 32 is an outer rotor brushless motor, wherein the rotor is provided on an outside and the stator is provided on an inside thereof.

In operation, fasteners are stored in the magazine assembly 14, which sequentially feeds the fasteners into the nosepiece assembly 18. The drive motor assembly 16 may be actuated/activated by the control module 38 to cause the driver 26 to translate and impact a lead fastener in the nosepiece assembly 18 (i.e., in the drive channel) so that the lead fastener may be driven into a workpiece (not shown). Actuation of the power source may utilize electrical energy from the battery pack 22 to operate the motor 32 and the drive actuator 36. The motor 32 is employed to drive the flywheel 34, while the drive actuator 36 is employed to move the (second) roller 50 that is associated with the roller assembly 40, which squeezes the driver 26 into engagement with the (rotating) flywheel 34 so that energy may be transferred from the flywheel 34 to the driver 26, to cause the driver 26 to translate. The nosepiece assembly 18 (and drive channel) guides the lead fastener as it is being driven into the workpiece. The return mechanism 30 biases the driver 26 back into a returned position. As seen in FIG. 12, for example, the return mechanism 30 includes a biasing member, or spring, which is configured to push (e.g., backwards, or to the left in the figure) the driver 26 back and away from the nosepiece assembly 18 after the driver 26 is deployed to fire a fastener from the tool 10.

As briefly noted above, the drive system 16 may include the activation arm assembly 28 that has at least one arm and at least one roller for moving the driver 26. The arm may be spring biased by a spring towards a first position, and the drive actuator 36 may be configured to initiate movement of corresponding parts within the tool, to thereby press against the spring-bias and move the arm into a second position. As the arm moves, the roller(s) move to press against and push the driver 26 into engagement with the flywheel 34 to cause the translational movement of the driver 26.

In accordance with an embodiment, the activation arm assembly 28 may include the drive actuator 36, a carriage 44 (see FIG. 9), a roller assembly carrier, a follower arm 48, a roller assembly 40 that includes a first roller 42 and a second roller 50, and a biasing mechanism 54. While FIG. 9 only shows one side (e.g., right) of the tool and thus the carriage 44, it should be understood that the carriage 44 may include a pair of arm members 56 (see FIG. 12) that can be spaced laterally apart, one on each side of the tool 10. Each arm member 56 can include an actuator slot 58, a pivot slot 60, a retainer aperture 62 and a notch (not shown) as depicted in FIG. 12. The arm members 56 may have a first portion configured to retain the drive actuator 36 (or solenoid 92, in accordance with one embodiment herein), and a second portion configured to retain the biasing mechanism 54 (shown in FIG. 11). The carriage 44 can be fixedly but removably coupled to the backbone via a tab 37 on each side of a spring cap. The tab 37 can be received through the retainer aperture 62.

As shown in FIG. 11, the biasing mechanism 54 can include a first cap 102, a second cap 104, a fastener 105 and a spring 106. The first cap 102 can have a generally cylindrical body member 108 and a flange that can be disposed about a body member which may be received in a hole in the first portion of the follower arm 48. Such features are further described in the incorporated '657 reference and thus not detailed here.

As generally understood in the art and thus not described in detail herein, the aforementioned roller assembly carrier may include axle(s) which extend through the carriage 44 and are received in pivot slots 60 for rotation about the axle(s) and for movement relative to the carriage 44. The first roller 42 (shown in FIG. 11) may be rotatably mounted on a first axle and the second roller 50 may be rotatably mounted on a second axle. In the illustrated, the centerline of the second axle is relatively closer to the retainer aperture 62 (see FIG. 12) than the centerline of the first axle when the roller assembly carrier is in the first predetermined position. The notch(es) 64 in the arm member(s) 56 of the carriage 44 are provided to permit the roller assembly carrier to be able to rotate between a predetermined first position and a predetermined second position. A torsion spring can be mounted to the carriage 44 and roller assembly carrier to bias the roller assembly carrier toward the first predetermined position. Exemplary further details of the roller assembly are described in the incorporated '657 reference.

As generally described previously with regards to the motor 32 and flywheel 34, actuation of the drive actuator 36 causes the roller assembly to translate toward (e.g., in a generally downward direction, as indicated the arrow in FIG. 11) and engage the driver 26 to initiate driving engagement between the driver 26 and the flywheel 34, and thus move the driver 26 into a drive channel or barrel 66 of the nosepiece assembly 18 that has a lead fastener therein.

The drive actuator 36 may be an electro-mechanical actuator such as a linear actuator. In accordance with one embodiment, the drive actuator 36 is a solenoid 92 that includes a body 93, a plunger 94 in the form of a shaft which is movable relative to the body 93 along an actuation axis 95, and a plunger spring 96 that biases the plunger 94 into an extended position. While the plunger spring 96 is illustrated in FIG. 11 as being received in the body 93, it will be appreciated that in the alternative the plunger spring 96 can be received about the plunger 94 between a feature on the plunger 94 and the plunger body 93 or between a feature on the plunger 94 and another part adjacent the body 93. The body 93 may include a housing 98 and a coil assembly 99 therein that can be electrically coupled to the control unit 38 (see, e.g., schematic representation of electrical connection of drive actuator 36 with the control module, as shown in FIG. 15). The body 93 may be fixedly coupled to the carriage 44 in a snap-fit manner, in accordance with an embodiment. The housing 98 may be sized to engage the arm members 56 such that abutment of the housing 98 against the arm members 56 limits movement of the body 93 relative to the arm members 56 when the coil assembly 99 is energized and the plunger 94 is being drawn into the body 93. The plunger 94 may include a through-hole for receipt of a pin 100 which is used to pivotally couple the follower arm 48 and the plunger 94. Accordingly the actuator slots 58 (shown in FIG. 12), which may be disposed generally parallel to the actuation axis 95, may guide and support the end of the plunger 94 to which the follower arm 48 is coupled.

The follower arm 48, as shown for example, in FIG. 11, may include a central arm member 76, that has a non-linear profile. The central arm member 76 is configured to pivot and move via pin 100 connecting it to the plunger 94 of the solenoid 92. As described below, when the plunger 94 moves (e.g., towards the left in FIG. 11), the central arm member 76 of the follower arm 48 is pulled and pivotable as the non-linear profile moves within the housing, in a general direction along or relative to the axis 95, and with respect to the roller assembly 40. The follower arm 48 is configured to contact the roller assembly 40 (and its carrier) and push or displace the roller assembly 40 in a direction toward the driver 26.

The driver 26 may be provided in the form of a driver blade that is configured for translational movement within a drive channel along a drive axis 118 to move within the drive channel/barrel 66 and drive the lead fastener into a workpiece. The driver 26 may be made of any number of materials, including, but not limited to, aluminum, nickel, steel, stainless steel, and/or combinations thereof.

FIGS. 11 and 12 illustrate the tool 10 in a state prior to activation of the solenoid 92/drive actuator 36. The plunger 94 of the solenoid 92 is located in an extended position (i.e., to the right in FIG. 11) and the follower arm 48 is biased upwardly (as viewed in the figure) in a direction away from the flywheel 34 and the driver 26. As shown in FIG. 11, the follower arm 48 and roller assembly 40 are in their respective home positions. The driver is also in a home position (or able to return to such a position, after driving the fastener). Also shown is that when the follower arm 48 and the roller assembly 40 are in their home positions, the solenoid 92 is not actuated and a spring (e.g., torsion spring) is used to bias the roller assembly 40 away from the flywheel 34.

Although not illustrated, per the previous detailed explanation, it should be understood that when the solenoid 92/drive actuator 36 has been actuated, the plunger 94 is pulled in a second direction (opposite to the first direction, i.e., towards the left in FIG. 11) into the body 93. Movement of the plunger 94 in the second direction displaces and pulls the follower arm 48 toward the body 93, which causes the follower arm 48 to act as a wedge against the first roller 42 to drive the roller assembly 40 toward the driver 26 (downwardly as viewed in the figure). The follower arm 48 transfers the force and displacement of the plunger 94 in a direction orthogonal to the axis 95 of the solenoid. The second roller 50 is thus moved into contact with the driver 26 and may further force or drive the driver 26 into driving engagement with the flywheel 34 as the roller assembly 40 is moved.

After the driver 26 has translated and fired the fastener from the nosepiece assembly, the return mechanism 30 may be employed to return the driver 26 to its starting position. When the driver 26 has been returned, the solenoid 92 may be deactivated to permit the plunger spring 96 to move the plunger 94 back towards its home position. Movement of the plunger 94 in this manner thus allows the follower arm 48 to move and in cause/allow the roller assembly 40 to travel away from the driver 26.

A feed assembly 110 (see FIG. 9) (or feed mechanism) is associated with the magazine assembly 14 and is configured to advance the fasteners contained therein in a feed direction to present a lead fastener into the nosepiece assembly 18. The feed assembly 110 has feed actuator 148 (e.g., see FIG. 1) configured to move said lead fastener into the nosepiece assembly 18. Generally, in accordance with an embodiment, the feed assembly 110 may include a biasing spring and a feed rod configured to move the lead fastener (from a set of collated fasteners contained in canister 200) into the nosepiece assembly 18. The biasing spring may bias the feed rod into a first position, and the feed actuator 148 may be configured to move (i.e., reciprocate) the feed rod to a second position, against a biasing force of the biasing spring, for moving said lead fastener into the nosepiece assembly 18. In an embodiment, features of the feed assembly may include those of the incorporated '521 reference.

Like the drive actuator 36, the feed actuator 148 may be an electro-mechanical actuator such as a linear actuator. The feed actuator 148 may be in the form of a solenoid 150 (see FIG. 9), in accordance with an embodiment, that includes a body 151, a plunger 152 in the form of a shaft which is movable relative to the body 151 along an actuation axis 153, and a plunger spring 154 that biases the plunger 152 into an extended position, e.g., towards the nosepiece assembly 18. While the plunger spring 154 is illustrated as being outside the body 151, it will be appreciated that in the alternative, the plunger spring 154 may be received about the plunger 94 within part of the plunger body 151, for example. The body 151 may include a housing 156 and a coil assembly 155 that can be electrically coupled to the control module 38 (see, e.g., schematic representation of electrical connection of feed actuator 148 with the control module, as shown in FIG. 15). The body 151 may be coupled to the feed mechanism 110, below the nosepiece assembly 18 and above the magazine 14/canister 200, in accordance with an embodiment. The plunger 152 may have an abutment structure associated therewith such that the plunger spring 154 extends between a top portion of the housing 156 (or body 151) and the abutment structure. Also, the plunger 152 may include a through-hole 158 at an upper portion thereof, e.g., for receipt of a spring (or portion thereof, see, e.g., FIG. 5), or pin. The housing 156 may be sized such that the plunger 152 is configured to move relatively therein and compress the plunger spring 154 when the coil assembly 155 is energized. In one embodiment, the plunger 152 may be drawn into the body 151. Accordingly, activation of the coil assembly 155 results in movement (e.g., pulling relatively downward) of the shaft of the plunger against the force of spring 154 to allow a nail to be loaded. When the feed actuator 148 is deactivated, the spring 154 biases the shaft of the plunger 154 upward and allows the nail to be loaded into a chamber (or drive channel) that is along the path of the driver 26.

In accordance with an embodiment, in the tool 10, the drive actuator 36 is positioned on a first axis 95, wherein the feed actuator 148 is positioned on a second axis 153. As evidenced by FIGS. 11 and 12, these first and second axes 95 and 153 are positioned at a non-perpendicular angle relative to one another. In one embodiment, the first or actuation axis 95 is positioned such that the axis 95 is parallel to the drive axis 118. In another embodiment, the second or actuation axis 153 is parallel to the feed direction (i.e., the axis extending at an angle from near a bottom of the tool 10 to the nosepiece assembly 18; see axis 146 in FIG. 12). In yet another embodiment, the first or actuation axis 95 is positioned such that the axis 95 is parallel to the drive axis 118, and the second or actuation axis 153 is parallel to the feed direction (i.e., axis 146 in FIG. 12).

In still yet another embodiment, the drive axis 95 of the drive actuator 36 is provided in a first plane and an axis 153 of the feed actuator 148 defining the feed direction is provided in a second plane, the first plane being different from said second plane.

While the exemplary illustrated embodiments are described as using solenoids 92, 150 as the electro-mechanical actuators, other forms of actuators may be used, for example, an electric motor, a single dual-action solenoid, a multi-stage solenoid, a solenoid in conjunction with a mechanical biasing element, such as a spring, a linear motion machine, or any combination thereof.

The drive actuator 36 (e.g., solenoid 92) and the feed actuator 148 (e.g., solenoid 150) are connected to the control module 38 (or controller) via control lines. The control module 38 and circuitry may be provided at the back end 52 of the housing assembly 12, for example. Control module is programmed to provide power and/or control signals (e.g., electric pulses) over control lines the actuators 36 and 148. The control module 38 may receive input from the trigger 20, which affects movement of the driver 26 and feed rod to load fasteners in the nosepiece assembly 18 of the tool 10. The control module 38 may be provided in the form of a microprocessor and one or more circuit boards, for example, including relay module and one or more MOSFETs. The control module 38 also communicates with the motor 32. Upon receiving a signal from the trigger switch 68 and a safety mechanism (contact trip assembly 21) and its switch, the control module 38 may be connected to the battery 22 to receive power therefrom and the drive actuator 36 may be activated. The control module 38 may signal the motor 32 to energize or activate for a predetermined amount of time (e.g., by applying voltage to the motor 32) before activating the drive actuator 36.

As is understood by one of ordinary skill in the art, the control module 38 is configured for outputting a driving control signal to the drive system 16 and for outputting a motor signal to control an operation of the motor 32 via selectively energizing coils (of the stator) of a plurality of phases of the motor 32. A position detector may be associated with the motor 32 to output a position signal corresponding to the position of a rotor (at one place) of the motor. The position detector may be a magnetic sensor such as a hall sensor/element or a hall IC, for example, and a hall signal may be output as the position signal. The position signal output from the position detector is input to the control module 38. In an embodiment, the control module 38 may include an inverter circuit design to output a control signal to the motor 32, to control the rotation of the motor 32. In one embodiment, the inverter circuit has six switching elements for supplying driving current to the respective coils of the motor 32, wherein three of the switching elements are high-side switching elements and three of the switching elements are low-side switching elements.

In accordance with an embodiment, the control module 38 may include the control unit and/or features of said unit as disclosed in U.S. Pat. No. 10,693,344, which is incorporated by reference herein in its entirety.

The control module 38 is configured to implement a firing sequence for driving each lead fastener into the workpiece (using the driver 26) and feeding the lead fastener into the nosepiece assembly 18. In particular, the control module 38 is designed to control the timing for actuating/activating the drive actuator 36 and the feed actuator 148, and, thus, the timing for feeding an electric pulse to each of the drive actuator 36 and the feed actuator, for a firing sequence (i.e., driving a fastener and (re) loading a lead fastener into the nosepiece assembly 18 for the next drive). That is, the firing sequence may include sending a first electric pulse to the drive actuator 36 and a second electric pulse to the feed actuator 148, in accordance with an embodiment.

Figure 13:
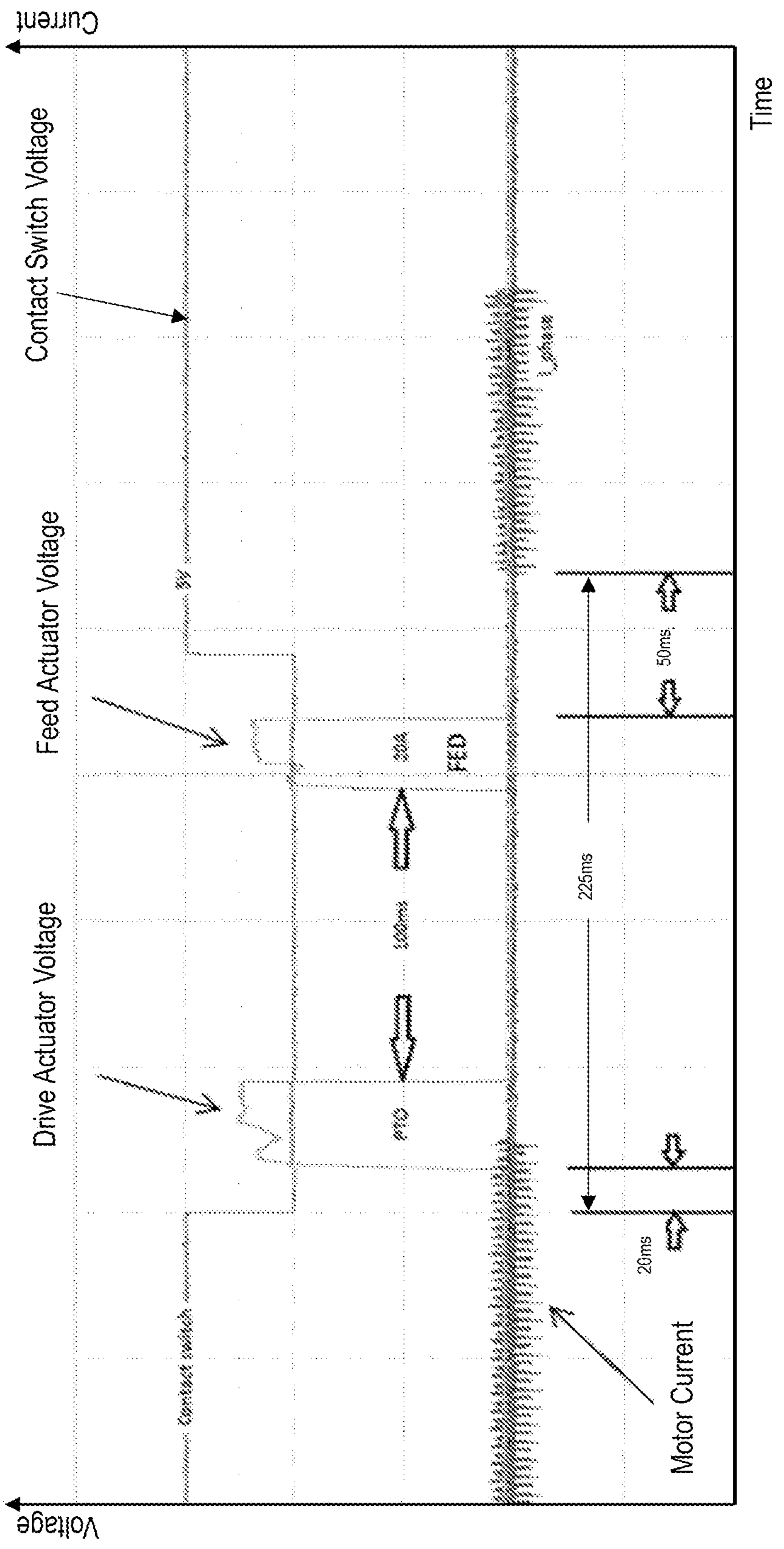
FIG. 13 illustrates a first excitation pattern for a firing sequence that is implemented by the tool, in accordance with an embodiment.

In an embodiment, the firing sequence implemented by the control module 38 results in an excitation pattern that includes selectively deactivating energization (power) to the motor in order activate the drive actuator 36 and the feed actuator 148. In one embodiment, the control module 38 is configured to deenergize or deactivate energization the motor for at least a part of each electric pulse (at least a portion of the first electric pulse and at least a portion of the second electric pulse) sent to the drive actuator 36 and to the feed actuator 148, in order to activate the drive actuator and the feed actuator. In one embodiment, the excitation pattern comprises a delay time interval between the electric pulses to the drive actuator 36 and the feed actuator 148. In an embodiment, the control module 38 is configured to calculate timing in the excitation pattern for feeding the first electric pulse to the drive actuator and the second electric pulse to the feed actuator for activation thereof during the firing sequence, and calculate a delay time interval between the first and second electric pulses. FIG. 13 illustrates one exemplary embodiment illustrating such features. Specifically, FIG. 13 shows output waveforms provided as a result of signals from the control module 38 to the contact trip switch, motor 32, drive actuator 36, and feed actuator 148. As previously mentioned, in an embodiment, the motor 32 may be initially energized or activated by the control module 38 before implementing a firing sequence (see, e.g., voltage signal (e.g. 5 V) for motor). A substantially constant signal (e.g., 5 V) may be supplied to the motor 32 for energization thereof when power is turned on for the tool. A voltage (e.g., 5 V) signal is provided to the contact trip switch. Upon tripping of the switch, a time delay is implemented before de-energizing the motor 32 and providing a pulse PTO (e.g., a current of 20 A) to the drive actuator. While the drive actuator 36 (and thus the drive system 16) is energized, power to the motor is limited or cut off. In accordance with an embodiment, the signal to the motor may be cut off shortly after the pulse PTO signal is sent to the drive actuator. As understood by a person skilled in the art, as a result of the cut off power supply, the coils of the motor 32 are thus not further energized and the rotor rotation winds down. As shown in FIG. 13, in one embodiment, a time delay of approximately 20+/−5 milliseconds is implemented before the control module 38 deploys a pulse FED (e.g., a current of 20 A) to the feed actuator 148. The power signal to the motor 32 may be optionally cut off during this pulse FED. As a result of the pulse FED, the plunger 154 may be moved downward against the force of spring 154 to allow a nail to be loaded. When the feed actuator 148 is deactivated, the spring 154 biases the shaft of the plunger 154 upward and allows the next nail to be loaded into a chamber (or drive channel) for the driver 26. Upon completion of the pulse FED, the motor 32 may be re-energized. In an embodiment, a second time delay may be implemented by the control module 38 after the pulse FED and before energizing the motor 32. In one embodiment, the second time delay is approximately 50+/−5 milliseconds (ms).

In an embodiment, the entire timing of the sequence from the time of activation of the contact switch (via trigger) to the time that the power to the motor is re-activated or re-energized (after the first and second electric pulses to the drive actuator and the feed actuator) is approximately 225 milliseconds (ms) (+/−5 ms).

Figure 14:
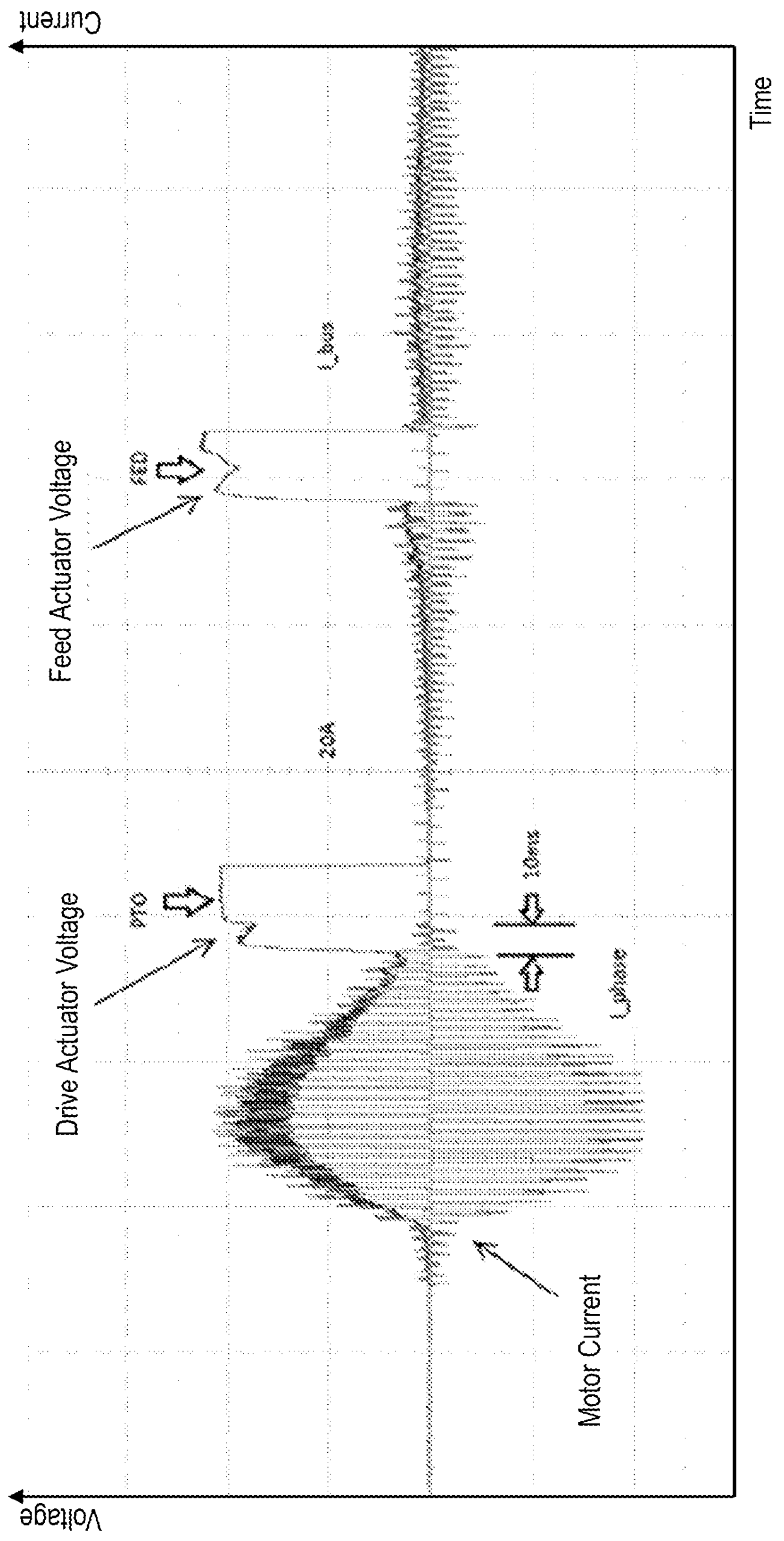
FIG. 14 illustrates a second excitation pattern for a firing sequence that is implemented by the tool, in accordance with another embodiment.

According to an embodiment, the control module 38 may be configured to activate or energize the motor during the time interval between the first and second electric pulses to the drive actuator 36 and the feed actuator 148. That is, rather than limiting or stopping the excitation signal to the motor during this time delay, at least some voltage is directed to the motor 32 until the pulse to the feed actuator 148. In an embodiment, the motor is activated for at least a portion of a time between the first electric pulse and the second electric pulse (to the drive actuator and the feed actuator, respectively). FIG. 14 illustrates an example of such features, wherein the motor receives a voltage signal between the first pulse PTO (the first electric pulse to the drive actuator 36) and the second pulse FED (equivalent to the pulse FED, i.e., the second electric pulse to the feed actuator 138). As a result, the rotational speed of the motor does not reduce as much during the pulses, and, therefore, the timing between the first and second electric pulses may be reduced. Furthermore, as a result of this reduced time delay between the pulses and by reverting power back to the motor and energizing the motor 32 during this delay, it has been observed that the number of fasteners or nails driven per second may be increased, e.g., from three nails per second (3 nail/sec) to four nails per second (4 nails/sec). This is a result of the energy (inertia) maintained in between the pulses of the sequence.

In particular, FIG. 14 shows output waveforms provided as a result of signals from the control module 38 to the motor 32, drive actuator 36, and feed actuator 148. As previously mentioned, in an embodiment, the motor 32 may be initially energized or activated by the control module 38 before implementing a firing sequence (see, e.g., voltage signal (e.g. 5 V) for motor). In the example illustrated, a larger amount of power may be supplied to the motor 32 for energization thereof when power is turned on for the tool. In an embodiment, activation of a contact switch may also provide additional power to the motor (e.g., anticipating that the trigger 20 will soon be pulled, and thus that driving of a nail will soon commence.) After tripping of the switch, a pulse PTO (e.g., a current of 20 A) to the drive actuator is implemented by the control module 38 and the signal to the motor 32 is cut-off after a time period. In accordance with an embodiment, the signal to the motor may be cut off approximately 10+/−5 milliseconds after the pulse PTO signal is sent to the drive actuator. While the drive actuator 36 (and thus the drive system 16), is energized, power to the motor is limited or cut off. In one embodiment, a time delay of approximately 100+/−10 milliseconds is implemented before the control module 38 deploys a pulse FED (e.g., a current of 20 A) to the feed actuator 148. However, during this time delay, the control module 38 is configured to energize the motor 32 by sending a signal thereto, as shown. The pulse FED may then be sent to the feed actuator 148, and the power signal to the motor 32 is cut off during this pulse. The feed actuator 148 may then load a next nail to be driven, as explained above, and then is deactivated. Upon completion of the pulse FED, the motor 32 may be re-energized.

Accordingly, the control module 38 is configured to perform a method that includes deactivating power to the motor; activating the drive actuator to thereby cause the translational movement of the driver thus drive the lead fastener into the workpiece; and activating the feed actuator to feed the lead fastener into the nosepiece assembly. In one embodiment, the motor is deactivated or deenergized for at least a part of each pulse sent to activate the drive actuator and the feed actuator. For example, as illustrated in FIG. 13 and FIG. 14, the power to the motor may be cut off or deactivated on or about (e.g., shortly after) a time for applying the PTO pulse to the drive actuator. In an embodiment, deactivating the power to the motor is performed before activating the drive actuator or within a predefined time period after activating the drive actuator. In an embodiment, deactivation may be a time period of approximately 0 (zero) to approximately 20 milliseconds (ms) (both inclusive and both +/−5 ms) from the time the pulse signal is sent to the drive actuator. In one embodiment, such as shown in FIG. 14, the power to the motor is deactivated approximately 0 to 10 ms after the pulse is sent to the drive actuator.

In an embodiment, the method employed by the control module 38 may also include deactivating the drive actuator and providing a time delay before activating the feed actuator. In an embodiment, the time delay/period between the first pulse (PTO pulse to the drive actuator) and the second pulse (FED pulse to the feed actuator) is approximately 100+/−10 milliseconds (ms).

Further, the method employed by the control module 38 may include activating power to the motor during the time delay.

The control module 38 is also configured to deactivate the feed actuator. In an embodiment, the power to the motor may be activated in a period of time after deactivation of the second pulse. In one embodiment, the time period is approximately 0 (zero) to approximately 50 milliseconds (both inclusive, and both +/−5 ms) after the second pulse is deactivated.

As understood by one of ordinary skill in the art, the timing sequence may, according to one embodiment, be based on a pre-programmed sequence that is based on time intervals known for performing each of the actions (e.g., driving the driver 26, feeding the nail). In one embodiment, one or more sensor may be used in the tool to communicate with the controller regarding the firing cycle and/or status (e.g., speed) of the motor.

Figure 7:
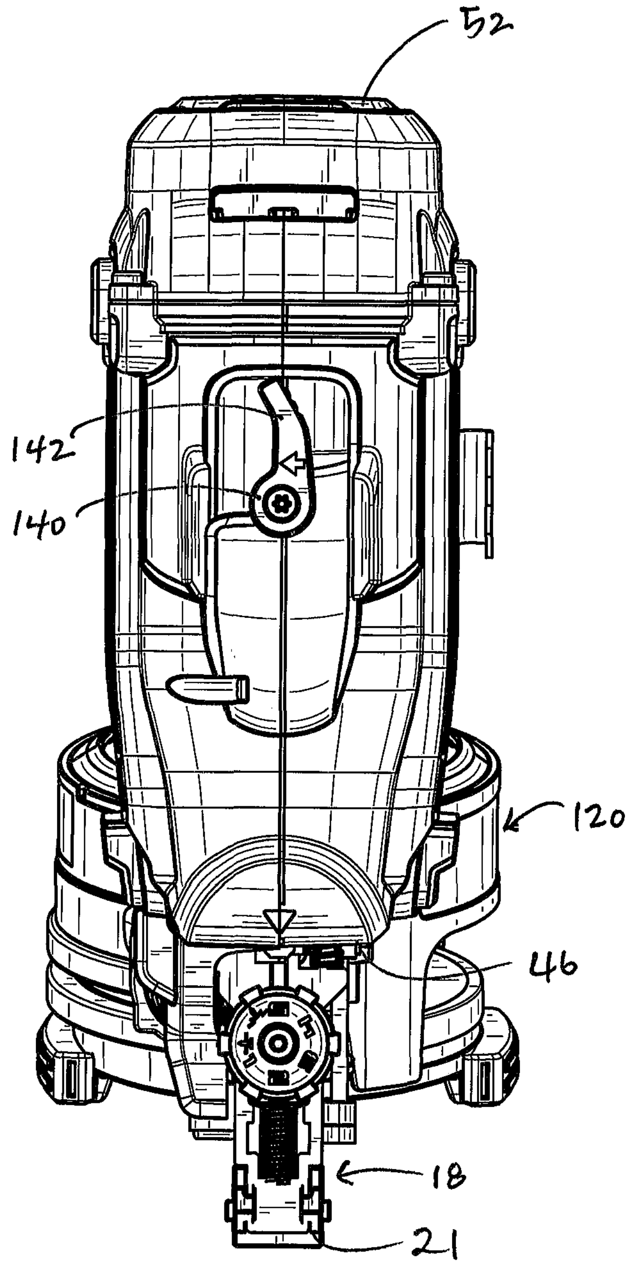
FIG. 7 illustrates a top plan view of the tool of FIG. 1.
Figure 8:
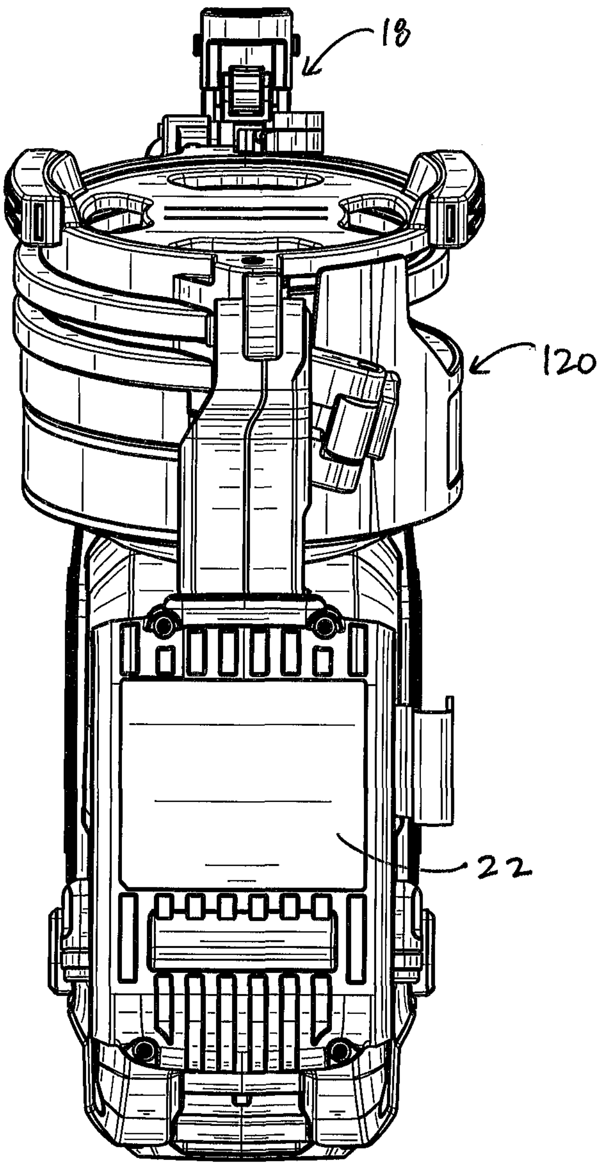
FIG. 8 illustrates bottom plan view of the tool of FIG. 1.

For the sake of completeness, other features may be provided on the tool 10. As shown in FIGS. 1 and 7, for example, a stall release lever 140 may be provided on an outside of the housing assembly 12 to address a stall condition or problem with regards to firing the tool 10, e.g., a jam. The stall release lever 140 includes a lever arm 142, a spool, and a flange. The spool and the flange rotate with the lever arm. The stall release lever may be activated by a user in an instance when a drive cycle is not completed. For example, when attempting to drive a nail into a hard material and insufficient power is available to fully sink the nail, the tool 10 may stall or jam. Other cases for an incomplete drive cycle may include operational anomalies such as improper nail loading, non-conforming nails being used, or worn or broken components in the tool. In operation, when a stall or jam occurs, the operator may rotate the lever arm in a counter clockwise direction to release the load on the activation system, thereby moving the roller assembly 40 away from driver 26. Thus, the components in the tool are able to return to their respective home positions.

As is generally known, one or more, or all, of the switches mentioned herein may be microswitches.

Figure 16:
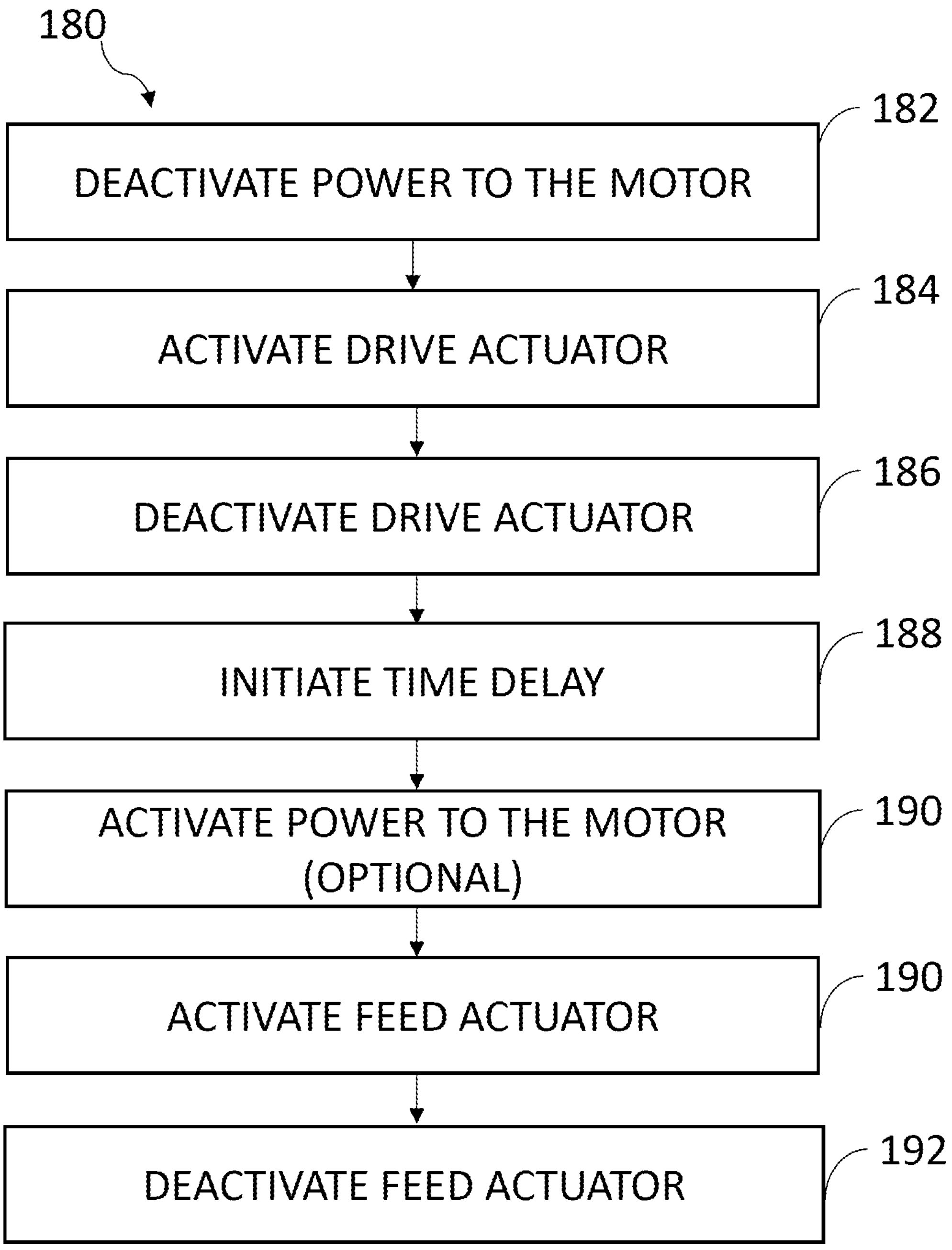
FIG. 16 shows steps of a method for operating the tool, in accordance with an embodiment, using the controller.

Accordingly, an exemplary operation of the tool 10 is illustrated in some of the method steps as shown in a method 180 according to FIG. 16. Operation of the tool 10 may include an operator or user positioning the nosepiece assembly 18 in position on a workpiece. As the operator places bias on the tool 10 towards the workpiece, the contact trip assembly 21 is moved or actuated, placing the tool 10 in an active state, waiting for the trigger 20 to be pulled or depressed. The control module 38 may send a signal to the motor 32 to energize it after the contact trip switch is tripped. When the trigger 20 is pulled by the operator, the trigger switch 68 is closed, initiating the control module 38 to activate the drive actuator 36, and shown in step 182, and thus drive a fastener. Power to the motor is limited and/or deactivated during the signals (electric pulses) to the drive actuator 36, as noted at step 182, which may be before or shortly after step 184. Accordingly, the driver 26 drives the lead fastener into the workpiece. Then, the drive actuator is deactivated by the controller after the fastener is driven into a workpiece, as shown at step 186. A time delay is then initiated, as shown at step 188. The motor 32 may optionally receive power after the deactivation of the drive actuator 36, during the time delay, as shown at step 190. Then, after the time delay period has passed, the power signal to the motor 32 is again cut off and the control module 38 activates the feed actuator 148, as shown in at step 190. As a result, the plunger 154 may be moved to load the force of spring 154 and to allow a nail to be loaded. Thereafter, the spring 154 biases the shaft of the plunger 154 back to its home position and loads the next fastener to be driven by the driver 26. Return of the feed actuator 148 and deployment of the next fastener into the drive channel is a result of the feed actuator 148 being deactivated, as shown at step 192, and then the motor may be re-energized for the next firing sequence. In accordance with an embodiment, the rotation of the motor 32 is deactivated by the controller for at least a part of the signals (electric pulses) sent to activate the drive actuator (step 184) and the feed actuator (step 190).

Reference throughout the specification to “one embodiment” or “an embodiment” means that a particular feature, structure, or characteristic described in connection with an embodiment is included in at least one embodiment of the subject matter disclosed. Thus, the appearance of the phrases “in one embodiment” or “in an embodiment” in various places throughout the specification is not necessarily referring to the same embodiment, or different embodiments. Further, the particular features, structures or characteristics may be combined in any suitable manner in one or more embodiments. Further, it is intended that embodiments of the disclosed subject matter cover modifications and variations thereof.

While aspects of this disclosure are described herein and illustrated in the accompanying drawings in the context of fastening tool, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made, and equivalents may be substituted for elements thereof without departing from the scope of the present disclosure. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

What is claimed is:

1. A tool comprising:

a housing having a nosepiece assembly;

a motor rotatably operating a flywheel;

a feed assembly comprising a feed actuator configured to present a lead fastener of a plurality of fasteners into the nosepiece assembly;

a drive assembly comprising a drive actuator and a driver configured for translational movement along a drive axis to drive the lead fastener into a workpiece, wherein the drive actuator moves the driver into engagement with the flywheel such that energy is transferred from the flywheel to the driver to cause the driver to move translationally; and a controller connected to the feed actuator and the drive actuator to implement a firing sequence for driving the lead fastener from the nosepiece assembly into the workpiece using the driver and feeding a subsequent lead fastener into the nosepiece assembly, wherein the firing sequence comprises an excitation pattern including a first electric pulse to the drive actuator and a second electric pulse to the feed actuator, and wherein the motor is activated for at least a portion of a time after the first electric pulse and before the second electric pulse, and for a portion of the time after the second electric pulse within the firing sequence, but the motor is not activated or a supply of electrical energy to the motor is reduced for at least a portion of a time during the second electric pulse.

2. The tool according to claim 1, wherein the tool further comprises a magazine assembly configured to hold the plurality of fasteners.

3. The tool according to claim 1, wherein the controller is configured to calculate timing in the excitation pattern for feeding the first electric pulse to the drive actuator and the second electric pulse to the feed actuator for activation thereof during the firing sequence, and calculate a delay time interval between the first and second electric pulses.

4. The tool according to claim 3, wherein the motor is deenergized for at least a part of each of the first electric pulse to the drive actuator and the second electric pulse to the feed actuator.

5. The tool according to claim 1, wherein the motor is an outer-rotor brushless motor, and the flywheel is disposed on the motor.

6. The tool according to claim 5, wherein the drive assembly further comprises an arm and a roller, the arm being spring biased by a spring towards a first position, the drive actuator being configured to press against the spring to move the arm into a second position such that the arm moves the roller to push the driver into engagement with the flywheel to cause the translational movement of the driver.

7. The tool according to claim 1, wherein the feed assembly further comprises a biasing spring and a feed rod configured to move the lead fastener into the nosepiece assembly, the biasing spring configured to bias the feed rod into a first position, and the feed actuator being configured to move the feed rod to a second position, against a biasing force of the biasing spring, for moving said lead fastener into the nosepiece assembly.

8. The tool according to claim 1, wherein the drive actuator is positioned on a first axis, wherein the feed actuator is positioned on a second axis, and wherein said first axis and said second axis are positioned at a non-perpendicular angle relative to one another.

9. The tool according to claim 1, wherein the drive axis of the driver is provided in a first plane and an axis of the feed actuator defining the feed direction is provided in a second plane, said first plane being different from said second plane.

10. The tool according to claim 1, wherein the drive actuator and/or the feed actuator comprises a solenoid.

11. A tool comprising:

a housing having a nosepiece assembly;

a motor rotatably operating a flywheel;

a feed assembly comprising a feed actuator configured to present a lead fastener of a plurality of fasteners into the nosepiece assembly;

a drive assembly comprising a drive actuator and a driver configured for translational movement along a drive axis to drive the lead fastener into a workpiece, wherein the drive actuator moves the driver into engagement with the flywheel such that energy is transferred from the flywheel to the driver to cause the driver to move translationally; and a controller connected to the feed actuator and the drive actuator to implement a firing sequence for driving the lead fastener from the nosepiece assembly into the workpiece using the driver and feeding a subsequent lead fastener into the nosepiece assembly, wherein the firing sequence comprises an excitation pattern including a first electric pulse to the drive actuator and a second electric pulse to the feed actuator, and wherein the motor is activated for at least a portion of a time after the first electric pulse and before the second electric pulse, but the motor is deactivated or a supply of electrical energy to the motor is reduced for at least a portion of a time during the first second electric pulse, and the motor is reactivated or the supply of electric energy to the motor is restored immediately after the second electric pulse.

12. The tool according to claim 11, wherein the tool further comprises a magazine assembly configured to hold the plurality of fasteners.

13. The tool according to claim 11, wherein the controller is configured to calculate timing in the excitation pattern for feeding the first electric pulse to the drive actuator and the second electric pulse to the feed actuator for activation thereof during the firing sequence, and calculate a delay time interval between the first and second electric pulses.

14. The tool according to claim 13, wherein the motor is deenergized for at least a part of each of the first electric pulse to the drive actuator and the second electric pulse to the feed actuator.

15. The tool according to claim 11, wherein the motor is an outer-rotor brushless motor, and the flywheel is disposed on the motor.

16. The tool according to claim 15, wherein the drive assembly further comprises an arm and a roller, the arm being spring biased by a spring towards a first position, the drive actuator being configured to press against the spring to move the arm into a second position such that the arm moves the roller to push the driver into engagement with the flywheel to cause the translational movement of the driver.

17. The tool according to claim 11, wherein the feed assembly further comprises a biasing spring and a feed rod configured to move the lead fastener into the nosepiece assembly, the biasing spring configured to bias the feed rod into a first position, and the feed actuator being configured to move the feed rod to a second position, against a biasing force of the biasing spring, for moving said lead fastener into the nosepiece assembly.

18. The tool according to claim 11, wherein the drive actuator is positioned on a first axis, wherein the feed actuator is positioned on a second axis, and wherein said first axis and said second axis are positioned at a non-perpendicular angle relative to one another.

19. The tool according to claim 11, wherein the drive axis of the driver is provided in a first plane and an axis of the feed actuator defining the feed direction is provided in a second plane, said first plane being different from said second plane.

20. The tool according to claim 11, wherein the drive actuator and/or the feed actuator comprises a solenoid.

* * * * *